Figure 1:
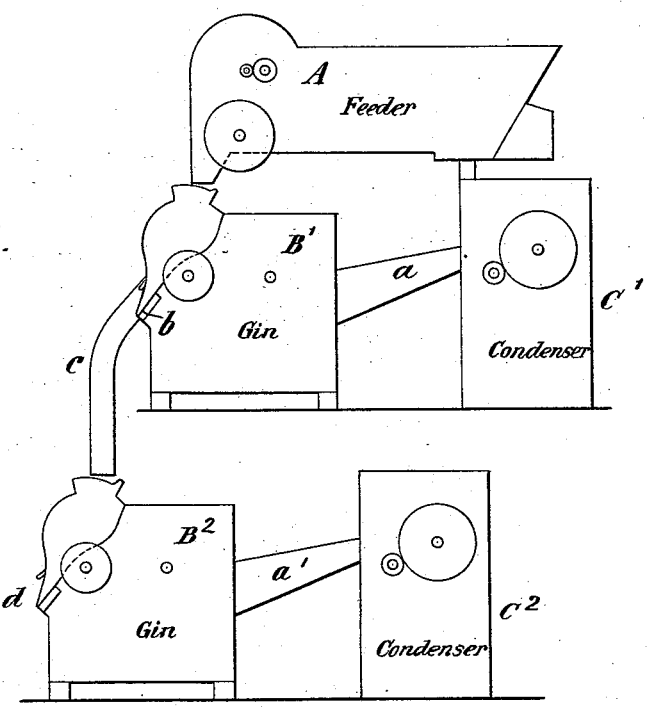

(No Model.)

J. A. BACHMAN.
PROCESS OF GINNING COTTON.

No. 508,126. Patented Nov. 7, 1893.

WITNESSES:
John Becker
Fred White

INVENTOR:
Joseph A. Bachman,
By his Attorneys,
Arthur C. Fraser & Co

UNITED STATES PATENT OFFICE.

JOSEPH A. BACHMAN, OF AUSTIN, TEXAS.

PROCESS OF GINNING COTTON.

SPECIFICATION forming part of Letters Patent No. 508,126, dated November 7, 1893.

Application filed June 14, 1892. Serial No. 436,640. (No specimens.)

*To all whom it may concern:*

Be it known that I, JOSEPH A. BACHMAN, a citizen of the United States, residing in Austin, in the county of Travis and State of Texas, have invented certain new and useful Improvements in Processes of Ginning Cotton, of which the following is a specification.

The object of this invention is to effect the ginning of cotton more rapidly and economically than heretofore.

In ginning as ordinarily practiced, the seed cotton is fed by a seeder to a saw gin which separates the fiber from the seed, the fiber being blown out into a condenser, and the cleaned seed being delivered beneath the gin. Seed cotton on being fed to the roll holder of the gin becomes a part of a revolving roll of partially ginned cotton which is kept in rotation by the motion of the saws, which continually draw the fiber from the lower rear side of the roll between the bars of the grate, while the ginned seeds fall out through the roll and escape through the opening at the bottom of the roll box. The ginning of cotton is attended by the practical difficulties that in order to insure the thorough removal of all fiber from the seed, it is necessary to so construct and adjust the roll box as to maintain a tight or close roll of partly ginned cotton, so that the action of the saws is hampered, and the escape of the ginned seeds is interfered with, thus making the ginning operation very slow. The seeds as the fiber is torn from them are dragged upwardly and carried around in the roll, and become wrapped up within the seed cotton that is continually being fed to the roll, so that it is only with difficulty that the seeds thus imprisoned are able to escape at the bottom of the roll box. The greatest economy is attained by such an adjustment as will insure the almost complete cleaning of the seed, leaving adhering to it only such a very short lint as cannot feasibly or economically be removed except by a delinter gin. To effectively remove the fiber from the seeds, it is necessary that the latter shall be held in a close roll so as to be tightly and firmly pressed against the saws, but the closer the roll becomes, the slower the ginning operation proceeds because of the increasing mass of seeds that is imprisoned in the roll of cotton, and of the increased density of the roll by which the fiber is held back and the drawing action of the saws is retarded.

My improved process, by means of which I have successfully overcome these difficulties, is based upon the principle of a gradual or successive ginning of the seed, somewhat analogous to the gradual reduction process of grinding wheat or other grain.

By my improved process, as shown by actual experience, over thirty-three per cent. more cotton can be ginned per saw in a given time than by the ordinary method.

My improved process is based upon the discovery that I have made that the ginning operation can be successfully subdivided by subjecting the seed cotton to a first ginning in an exceedingly loose or open roll, and then subjecting the partly ginned seeds that fall therefrom to a second ginning in a very close, tight or firm roll. The two operations are or may be performed in any ordinary gin now on the market and adapted for successfully ginning seed cotton, the only necessary difference being that the roll-box of the gin performing the first operation shall be so adjusted as to maintain the roll in a very loose or open condition, while the roll-box of the gin for performing the second operation should be so adjusted as to maintain the roll in a very close, firm or compact condition.

My invention, then, involves as its distinctive features, the ginning of seed cotton by first subjecting it to the ginning action of saws while maintained in a loose or open roll, so loose and open that the saws can freely and rapidly draw the fiber from the seeds, taking therefrom chiefly the long staple fiber, and that the seeds when thus partially denuded of fiber may freely and easily fall through the roll and be delivered from the machine; and in subsequently subjecting the partly ginned seeds resulting from this first operation to a second ginning while maintained in the condition of a tight or compact roll, its compactness being such as to firmly press the seeds against the grate and subject them to the close and effective action of the saws, while sufficiently retarding the escape of the seed to insure that no seed shall be delivered from the roll-box until thoroughly denuded of fiber.

By my improved process the difficulties heretofore encountered are wholly overcome. The long staple fiber is drawn rapidly and freely from the seed without any retardation or clogging of the saws, and the seeds as soon as freed from the long fiber drop quickly out through the loose and open roll, where they are no longer in the way, and have no effect to retard the ginning of the seed cotton as it is fed in. There is consequently no winding up of ginned seeds within the roll so that they are imprisoned and their escape retarded, as in ordinary ginning. Much the larger part of the fiber is removed from the seed in this first ginning operation, which is performed many times more rapidly than the operation in ordinary ginning. In short, this first ginning operation is not retarded by the necessity of recovering all of the lint from the seed as in the ordinary operation of ginning. In the second ginning operation, there being comparatively little fiber present, and scarcely any long fiber, the roll may be maintained in very tight or compact condition without thereby winding up or imprisoning the ginned seeds in newly fed fiber. Hence it is feasible to operate with a tighter roll than in ordinary ginning, so that the seeds are more thoroughly cleaned or denuded of fiber than heretofore. This second operation results in the delivery of much less fiber than the first operation, but being performed without the obstructing presence of long staple fiber, the action of the saws is confined wholly to cleaning the seeds, so that the latter are acted upon very much more rapidly than in ordinary ginning.

Thus my improved process by the simultaneous utilization of two ordinary gins, which by simple readjustment have been adapted to operate under the conditions demanded by my invention, effects a marked economy in the ginning operation by reason of the greater rapidity with which it is connected, and also has the additional advantage of separating or sorting the ginned cotton into two different grades, namely, the long staple and the short staple. To effect this separation, it is only necessary to provide each gin with its own condenser in the ordinary manner. If, however, the separation of the ginned cotton is not desired, both gins may deliver to one condenser.

Figure 2:
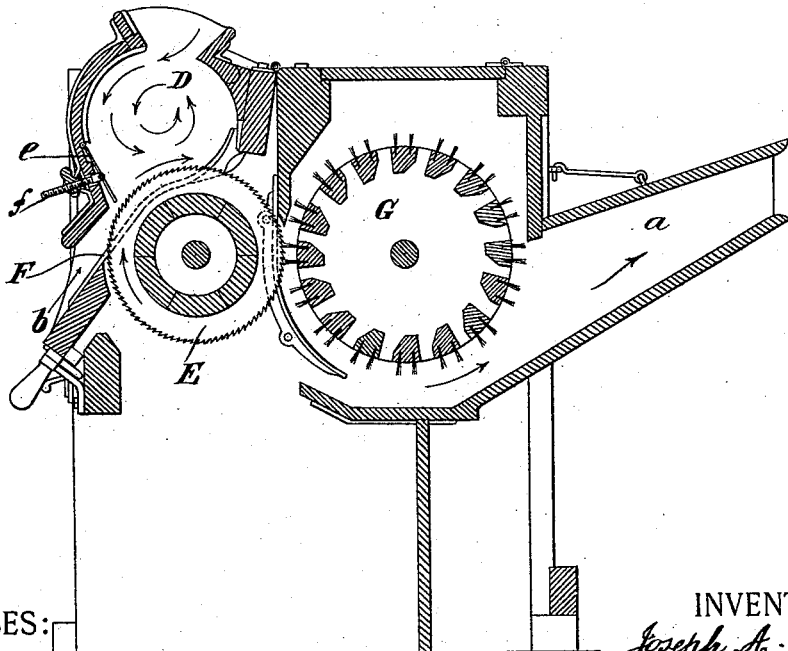

Figure 1 of the accompanying drawings illustrates in side elevation such a combination of ordinary apparatus as is suitable for carrying my improved process into effect. Fig. 2 is a vertical transverse section on a larger scale of either of the gins shown in Fig. 1.

Referring to Fig. 1, A designates a feeder of any ordinary or suitable construction adapted for feeding seed cotton to a gin. B' and B² are cotton gins of any usual or suitable construction known in the art. C' and C² are condensers of any known or suitable construction. The cotton delivered to the feeder A is by the operation thereof fed uniformly into the roll-box of the first gin B'. The fiber drawn off by this gin is discharged through a chute $a$ into the condenser C'. The partly ginned seeds from the first ginning operation are discharged at the seed outlet $b$, and fall through a chute $c$ into the roll-box of the second gin B², wherein the ginning is completed, and the cleaned seeds are finally discharged from this gin at $d$. The fiber drawn from the seeds in this second gin is delivered through a chute $a'$ into the condenser C².

Fig. 2 shows the internal construction of either of the gins. The gin here shown is an ordinary and well known construction, and is not necessarily altered by my invention. Its construction is illustrated here only for the purpose of enabling the necessary adjustments to be understood. It is constructed with the usual roll holder or breast D, with the usual gang of saws E, the usual grate F, and the usual brush G, for delivering the fiber from the saws and blowing it out through the chute $a$. The arrows show the direction of motion of the saws and brush, while the arrows in the roll-box D show the direction of travel of the roll. At the bottom of the breast or roll-box is a discharge opening $b$ through which the ginned or partly ginned seeds are discharged. Just above this outlet the seed board or front of the breast is provided with a regulating plate lettered $e$, which is hinged to the seed board and adjusted to different angles by the turning of a screw $f$. By the position of this plate, the looseness or tightness of the roll is adjusted. The condition of the roll may be affected by the shape of the roll-box D, but assuming the roll-box to be of such shape as to admit of either a loose or tight roll, the adjustment of the roll in this respect can be effected by raising or lowering the plate $e$. This is the usual construction provided in cotton gins as ordinarily made for enabling them to be adjusted to adapt them to different kinds or qualities of seed cotton, and to determine the closeness to which the seeds shall be ginned. In practicing my process, I avail myself of the presence and capability of this adjusting device in order to regulate the density of the rolls in the two gins to conform to the conditions required by my process. For the roll-box of the upper gin, the plate is adjusted upward sufficiently and its lower or free edge sufficiently retracted from the saws to cause the roll to revolve with the utmost freedom and in the loosest possible condition, and to enable the seeds to fall out with the least possible obstruction. In the roll-box of the lower or second gin, the plate is adjusted downward and its free edge is made to closely approach the saws in order to retard the egress of the seeds and maintain the roll in a close and compact condition. Whenever the adjustment of the upper or first gin is such as to draw off so much fiber as to leave not enough fiber, or not enough long fiber, to maintain the lower roll intact, that is, to prevent it from breaking or stopping, I find it expedient to provide the roll-box of the lower or second gin with a "float" or revolving bar arranged within the box, and having arms by which the mass or roll of seed is kept in rotation. This float is a common expedient in the art of ginning.

A suitable construction of float is shown in my application, Serial No. 441,468, filed July 28, 1892.

My improved process by thus simultaneously utilizing two ordinary gins under the conditions essential to my invention, results in an important saving both in the cost or running expense of ginning, and in the machinery and room required. Two ordinary gins having each seventy saws require as ordinarily used each a separate seventy-saw feeder and a seventy-saw condenser. The same machines arranged to operate in succession according to the conditions of my invention, will do one-third more work than if operated separately according to the old method, and require only one feeder, and (if the separation of the two grades of fiber is not desired) require only one condenser. The practical result of my invention is, that four bales of cotton may be ginned in the same time and with the same power as have heretofore been required for ginning three bales, while at the same time the other machinery required is reduced one-half, so that the outlay for machinery and for gin houses to contain them is proportionately reduced.

I am aware that attempts have heretofore been made to accomplish the results attained by my invention, but so far as I am aware all attempts heretofore made in the direction of the gradual or successive ginning of seed cotton, or for removing the long and short staple fiber by successive operations, have been either wholly inoperative, or have resulted in no advantage as compared with the ordinary and accepted processes of ginning. All such prior methods are distinguished from my invention in that they lack the essential feature which constitutes the gist of my discovery, namely, that the essential of success is involved in the maintenance of the seed cotton during the first ginning operation in a very loose roll, much looser than that in ordinary ginning, and in the maintenance of the roll during the second ginning operation in comparatively tight or close condition, as fully herein specified.

I claim as my invention the improved process as hereinafter defined, substantially as hereinbefore specified, namely:

1. The improved process of ginning cotton which consists in first subjecting seed cotton to a ginning operation while maintained in a loose or open roll, and then subjecting the resulting partly ginned seed cotton to a ginning operation while maintained in a tight or close roll.

2. The improved process of ginning cotton which consists in first subjecting seed cotton to a ginning operation while maintained in a roll more loose or open than in ordinary ginning, and so loose that the partly ginned seeds from which the greater portion of the long staple fiber has been removed can freely fall out and be discharged, and then subjecting the resulting partly ginned seeds thus discharged to a second ginning operation while maintained in a relatively tight or close roll, more close than in ordinary ginning, and so close that the seeds are retained in the roll until the remaining long staple fiber and all short staple fiber has been removed and the seeds thoroughly cleaned.

In witness whereof I have hereunto signed my name in the presence of two subscribing witnesses.

JOSEPH A. BACHMAN.

Witnesses:
A. C. GOETH,
W. L. ROSSITER.